US007653047B2

(12) United States Patent
Lee (10) Patent No.: US 7,653,047 B2
(45) Date of Patent: Jan. 26, 2010

(54) GUARANTEEING QUALITY OF SERVICE (QOS) USING BANDWIDTH RESERVATION IN SWITCH

(75) Inventor: Dae-Hyun Lee, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 1114 days.

(21) Appl. No.: 11/028,860

(22) Filed: Jan. 5, 2005

(65) Prior Publication Data
US 2006/0045074 A1   Mar. 2, 2006

(30) Foreign Application Priority Data
Sep. 2, 2004   (KR) .................. 10-2004-0070085

(51) Int. Cl.
*H04L 12/66* (2006.01)
(52) U.S. Cl. .................. 370/352; 370/260; 370/395.21; 370/400; 455/445; 455/452.1; 709/226; 709/240; 709/251
(58) Field of Classification Search .................. 370/230, 370/235, 352, 410, 468, 395.21, 400, 260; 380/270; 709/227, 226, 240, 251; 455/445, 455/452.1
See application file for complete search history.

(56) References Cited

U.S. PATENT DOCUMENTS

| 5,903,558 | A  | * | 5/1999 | Jones et al. ................. 370/351 |
| 6,006,264 | A  | * | 12/1999 | Colby et al. ................ 709/226 |
| 6,282,192 | B1 | * | 8/2001 | Murphy et al. .............. 370/352 |
| 6,426,948 | B1 | * | 7/2002 | Bowman-Amuah ......... 370/260 |
| 6,452,924 | B1 | * | 9/2002 | Golden et al. ............... 370/352 |
| 6,522,629 | B1 | * | 2/2003 | Anderson, Sr. ............. 370/236 |
| 6,529,499 | B1 | * | 3/2003 | Doshi et al. ................ 370/352 |
| 6,798,745 | B1 | * | 9/2004 | Feinberg ..................... 370/235 |
| 6,865,150 | B1 | * | 3/2005 | Perkins et al. .............. 370/230 |
| 6,907,004 | B1 | * | 6/2005 | Ramsey et al. ............. 370/235 |
| 7,054,327 | B2 | * | 5/2006 | Hagirahim et al. ......... 370/410 |
| 7,089,009 | B1 | * | 8/2006 | Fauconnier ................. 455/445 |
| 7,236,483 | B2 | * | 6/2007 | Yeom ......................... 370/352 |
| 7,269,423 | B2 | * | 9/2007 | Lee et al. ................. 455/452.1 |
| 7,440,573 | B2 | * | 10/2008 | Lor et al. .................... 380/270 |
| 7,486,684 | B2 | * | 2/2009 | Chu et al. ................... 370/401 |
| 7,486,696 | B2 | * | 2/2009 | Garg et al. .................. 370/468 |
| 2002/0124114 | A1 | * | 9/2002 | Bottom et al. ............. 709/251 |
| 2004/0052248 | A1 | * | 3/2004 | Frank et al. ................ 370/352 |
| 2004/0081140 | A1 | * | 4/2004 | Martin ....................... 370/352 |
| 2006/0168337 | A1 | * | 7/2006 | Stahl et al. ................. 709/240 |
| 2007/0110043 | A1 | * | 5/2007 | Girard ........................ 370/352 |
| 2008/0104251 | A1 | * | 5/2008 | Xu et al. .................... 709/227 |

* cited by examiner

*Primary Examiner*—Gerald Gauthier
(74) *Attorney, Agent, or Firm*—Robert E. Bushnell, Esq.

(57) ABSTRACT

A method for guaranteeing Quality of Service (QoS) using bandwidth reservation in a switch includes: establishing a MAC table including MAC addresses of terminals connected to each port of the switch and an identifier indicating whether or not the corresponding terminal is a VoIP terminal; calculating a VoIP bandwidth necessary for each port based on information of the MAC table, calculating a ratio of an entire bandwidth to a bandwidth equal to the entire bandwidth minus the VoIP bandwidth, and setting the ratio as a port ratio of the switch; determining whether or not the corresponding packet is a VoIP packet by filtering the MAC address of the corresponding packet upon an arbitrary packet of the switch being input; and passing the corresponding packet upon a determination that the corresponding packet is a VoIP packet, and passing the corresponding packet only when the bandwidth of the corresponding packet is within a permissible limit of the set port ratio by performing port ratio control upon a determination that the corresponding packet is not a VoIP packet.

15 Claims, 6 Drawing Sheets

| PORT | MAC Table | FLAG |
|---|---|---|
| 0 | 00:00:F0:12:34:56 | 0 |
|   | 00:00:F0:23:45:67 | 0 |
| 1 | 00:00:F0:12:23:34 | 0 |
| 2 |  |  |
| 3 | 00:00:F0:11:22:33 | 1 |
|   | 00:00:F0:AA:BB:CC | 0 |
| 15 | 00:00:F0:13:24:35 | 0 |

| MAC Table | FLAG |
|---|---|
| 00:00:F0:34:56:78 | 0 |
| 00:00:F0:45:67:89 | 1 |
| 00:00:F0:67:89:AB | 1 |
| 00:00:F0:AB:CD:EF | 0 |
| 00:00:F0:13:56:78 | 1 |
| 00:00:F0:15:46:89 | 1 |

GUARANTEEING QUALITY OF SERVICE (QOS) USING BANDWIDTH RESERVATION IN SWITCH

CLAIM OF PRIORITY

This application makes reference to, incorporates the same herein, and claims all benefits accruing under 35 U.S.C. §119 from an application for METHOD AND SYSTEM FOR GUARANTEEING QUALITY OF SERVICE USING BAND WIDTH RESERVATION IN SWITCH earlier filed in the Korean Intellectual Property Office on Sep. 2, 2004 and there duly assigned Serial No. 2004-70085.

BACKGROUND OF THE INVENTION

1. Field of the Invention

The present invention relates to guaranteeing Quality of Service (QoS) in a Voice over Internet Protocol (VoIP). More particularly, the present invention relates to a method and system for guaranteeing QoS of a VoIP by reserving a bandwidth in a layer 2.

2. Description of the Related Art

QoS is a service level required for a specific application program. Since an Internet network based on an IP provides a best-effort data service, it does not guarantee a high QoS. However, it is necessary to guarantee QoS on the IP network in order to embody the VoIP.

In the conventional technology to guarantee the QoS, there are two protocols, that is, a Diffserv (Differentiated Services) protocol that uses priority queuing via various queuing methods in a layer 3 and a RSVE (Resource Reservation) protocol that guarantees a bandwidth.

Meanwhile, a layer 2 is a scheme used to guarantee the QoS, which introduces only a priority scheme utilizing IEEE 802.1p and does not introduce a QoS guarantee scheme via a guarantee of the bandwidth.

It is necessary to guarantee a sufficient bandwidth in order to guarantee an optimum quality of sound in the case of VoIP. However, a minimum bandwidth for the VoIP service is sometimes not guaranteed due to a bandwidth congestion phenomenon in a service in which the bandwidth is variably used by sharing a general data service and a bandwidth in the VoIP.

Such a problem does not occur when VoIP terminals exist in the same switch since the switch has a property of guaranteeing a wire speed between the VoIP terminals. However, such a problem sometimes occurs when the VoIP terminals exist in different switches since the switch has an uplink bandwidth limitation between the VoIP terminals.

In the case of using a hub, of course, such a problem also occurs between the VoIP terminals positioned in the same hub. In this case, the loss and delay of a VoIP packet increases due to a bandwidth loss, and the jitter increases due to the variable data service so that it has a serious effect on the VoIP sound quality.

In an LAN system, a backbone switch is connected to a number of switches, that is, a switch a, a switch b, a switch c, a switch d, . . . , a switch x. The backbone switch is also connected to a data terminal, such as a Personal Computer (PC).

The switch a and switch b are connected to various data terminals. These data terminals can include an IP phone, a PC, a PDA, and so on.

The switch a is also connected to other switches, a switch a' and a switch b', and the switch a' is connected to a switch a" and a switch b".

One switch is connected to a number of switches and those switches are connected to other switches, and such a process can be continuously expanded.

When the uplink of the switch a supports a bandwidth of 100M and each of the switch a' and switch b' also has a bandwidth of 100M for their uplinks, a problem can occur when a large quantity of data is transmitted from a PC#5 connected to the switch a" to a PC#1 connected to the switch a.

Since the uplinks of the switch a" and switch a' are limited to a bandwidth of 100M, respectively, a severe data congestion phenomenon occurs when a data transmission service is performed between terminals connected to the switch a and switch a' and other terminals connected to the switch a" or the switch b".

This is due to a lack of bandwidth, which has a serious effect on a quality of sound when VoIP service is provided between an IP Phone #1 and an IP Phone #3.

In particular, a window size is changed for flow control for a data service that uses a TCP protocol, where the bandwidth is variably used, which causes a problem of increasing the jitter that has the most noticeable effect on a quality of sound in the VoIP service.

SUMMARY OF THE INVENTION

It is, therefore, an object of the present invention to provide a method and system to guarantee VoIP QoS by performing a bandwidth reservation function in a communication layer 2 switch.

According to one aspect of the present invention, a method of guaranteeing Quality Of Service (QoS) using bandwidth reservation in a switch is provided, the method comprising: establishing a MAC table including MAC addresses of terminals connected to each port of the switch and an identifier indicating whether or not the corresponding terminal is a Voice over Internet Protocol (VoIP) terminal; calculating a VoIP bandwidth necessary for each port based on information of the MAC table, calculating a ratio of an entire bandwidth to a bandwidth equal to the entire bandwidth minus the VoIP bandwidth, and setting the ratio as a port ratio of the switch; determining whether or not the corresponding packet is a VoIP packet by filtering the MAC address of the corresponding packet upon an arbitrary packet being input into the switch; and passing the corresponding packet upon a determination that the corresponding packet is a VoIP packet, and passing the corresponding packet only when the bandwidth of the corresponding packet is within a permissible limit of the set port ratio by performing port ratio control upon a determination that the corresponding packet is not a VoIP packet.

Establishing the MAC table comprises: acquiring and storing the MAC addresses of terminals connected to each port of the switch; receiving arbitrary information from each terminal and determining whether or not the corresponding terminal is a VoIP terminal; and accessing the MAC addresses stored in the switch and acquiring the MAC address of the terminal connected to the corresponding port in each port of the switch, and generating the MAC table by setting a flag indicating that an arbitrary terminal corresponding to the acquired MAC address is a VoIP terminal according to the result of the determination.

Determining whether or not the corresponding terminal is a VoIP terminal comprises recognizing the corresponding terminal as a VoIP terminal upon identification information indicating that the corresponding terminal is a VoIP terminal set in a Dynamic Host Configuration Protocol (DHCP) message used to perform a DHCP process assigning an IP address to the VoIP terminal.

The DHCP message comprises identification information set in an option 13 indicating a host, the identification information indicating that the corresponding terminal is a VoIP terminal.

Setting the port ratio of the switch comprises: acquiring bandwidth information required for each terminal set as a VoIP terminal in the MAC table; counting the number of terminals set as VoIP terminals in the MAC table for each kind of terminal; calculating a bandwidth required for an entire VoIP terminal by calculating the bandwidth for each terminal and the number of corresponding terminals; and calculating a ratio of an entire bandwidth supportable in the switch to a bandwidth equal to the entire bandwidth minus the entire VoIP bandwidth and setting the ratio as a port ratio. The bandwidth required for the corresponding VoIP terminal is acquired from a database storing at least one piece of bandwidth information for each codec.

According to another aspect of the present invention, a communication system is provided comprising: a switching system adapted to establish a MAC table including MAC addresses of terminals connected to each port of a switch and an identifier indicating whether or not the corresponding terminal is a VoIP terminal, and adapted to process the corresponding packet by assigning a bandwidth reserved in the switch upon the corresponding packet being determined to be a VoIP packet on the basis of the MAC table by filtering an originating MAC address of the corresponding packet upon an arbitrary packet being input; and at least one VoIP terminal, the at least one VoIP terminal being assigned an IP address from the switching system by being connected to the switch of the switching system, and being guaranteed a Quality of Service (QoS) set using the bandwidth reserved in the switch of the switching system via the MAC address of the VoIP terminal registered in the MAC table of the switching system.

The switching system comprises: a VoIP signaling gateway adapted to manage switching and processing of a voice signal, a subscriber terminal, and bandwidth information needed for each voice codec; a VoIP media gateway adapted to convert a voice into data using a voice compression and decompression function and to transceive the data via a data network; a switch module adapted to pass an arbitrary packet upon the packet being determined to be a VoIP packet by performing MAC filtering upon the arbitrary packet being input, and adapted to pass or block the packet depending on an already set port ratio upon the packet being a packet other than a VoIP packet; and a router module adapted to establish a MAC table including MAC address information of the terminals connected to each port of the switch module and identification information indicating that an arbitrary terminal is a VoIP terminal, and adapted to calculate a bandwidth required in the VoIP terminal connected to the switch module, and adapted to set a port ratio of the switch in the switch module according to a ratio of an available entire bandwidth to a bandwidth equal to the entire bandwidth minus the VoIP bandwidth.

The router module is adapted to arrange the MAC addresses of the terminals connected to the corresponding port acquired from each port of the switch module upon establishing the MAC table, and to set a flag to indicate that each terminal connected to the corresponding port is a VoIP terminal upon each terminal connected to the corresponding port being determined to be a VoIP terminal.

The router module is adapted to assign and manage an IP address for each terminal connected to the switch module by driving a Dynamic Host Configuration Protocol (DHCP) server module.

The router module is adapted to recognize the corresponding terminal as a VoIP terminal upon identification information indicating that the corresponding terminal is a VoIP terminal being set in a DHCP message used to perform a DHCP process assigning an IP address to the VoIP terminal.

The DHCP message comprises information set in an option 13 indicating a host, the identification information indicating that the corresponding terminal is a VoIP terminal.

The VoIP terminal is assigned an IP address from the switching system by driving a DHCP client module.

According to yet another aspect of the present invention, a method of guaranteeing a Quality of Service (QoS) using bandwidth reservation in a switch is provided, the method comprising: establishing a MAC table including MAC addresses of terminals connected to each port of the switch and an identifier indicating whether or not the corresponding terminal is a specific terminal; calculating a reservation bandwidth necessary in each port based on information of the MAC table, calculating a ratio of an entire bandwidth to a bandwidth equal to the entire bandwidth minus the reservation bandwidth, and setting the ratio as a port ratio of the switch; determining whether or not the corresponding packet is a packet of the specific terminal by filtering a MAC address of the corresponding packet upon an arbitrary packet being inputted to the switch; and passing the corresponding packet upon a determination that the corresponding packet is the packet of the specific terminal, and passing the corresponding packet only when a bandwidth of the corresponding packet is within a permissible limit of the set port ratio by performing port ratio control upon a determination that the corresponding packet is not the packet of the specific terminal.

According to still another aspect of the present invention, a communication system is provided comprising: a switching system adapted to establish a MAC table including MAC addresses of terminals connected to each port of a switch and an identifier indicating whether or not the corresponding terminal is a specific terminal, and adapted to process the corresponding packet when an arbitrary packet is inputted by assigning the bandwidth reserved in the switch when the corresponding packet is determined to be a packet of the specific terminal on the basis of the MAC table by filtering an originating MAC address of the corresponding packet; and at least one communication terminal adapted to being assigned an IP address from the switching system by being connected to the switch of the switching system, and adapted to being guaranteed QoS using a bandwidth reserved in the switch of the switching system via the MAC address of the VoIP terminal registered in the MAC table of the switching system.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Figure 1:
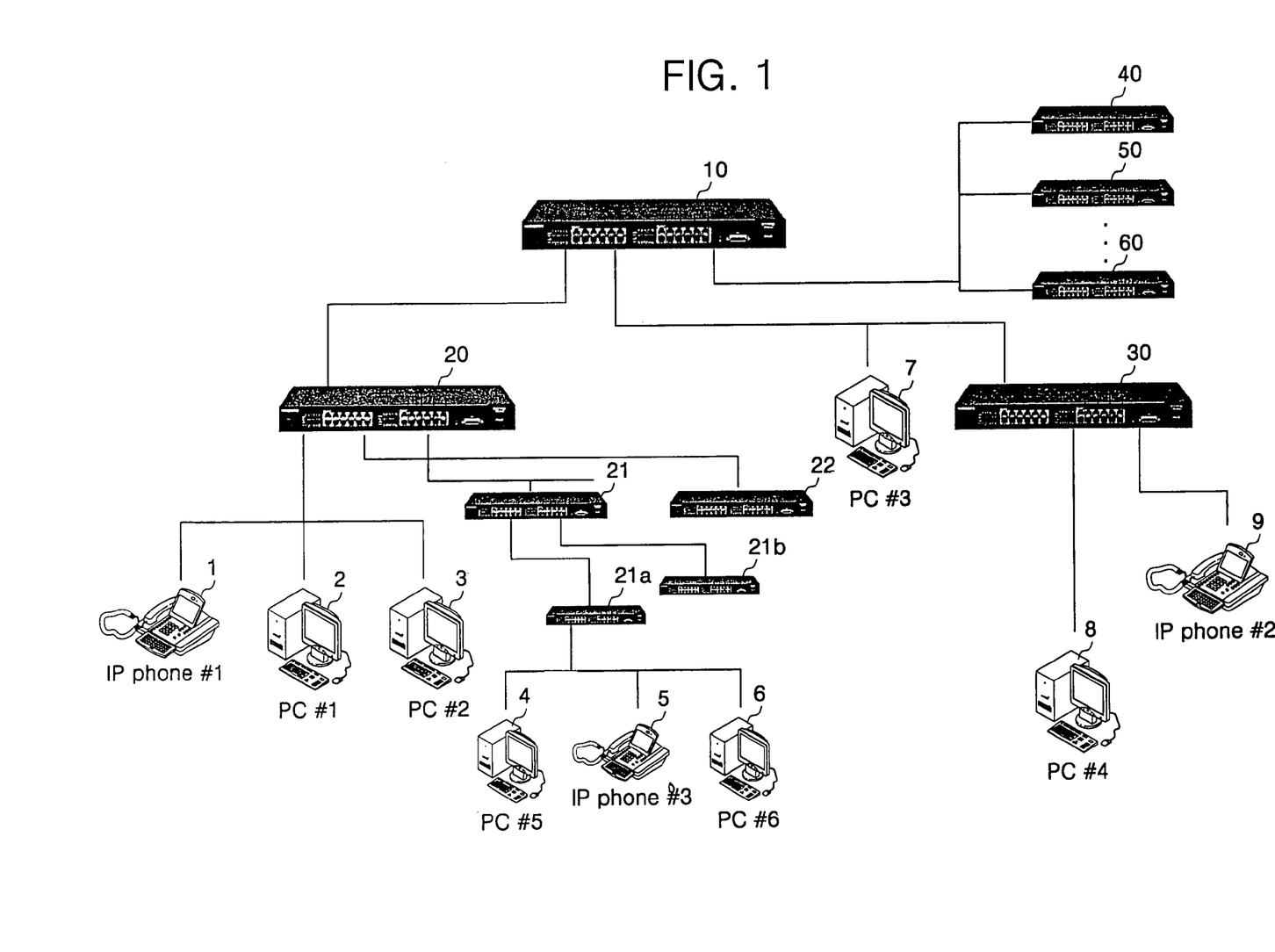
FIG. 1 is a view of a system configuration of a LAN.

FIG. 1 is a view of a system configuration of a LAN.

Referring to FIG. 1, a backbone switch 10 is connected to a number of switches, that is, a switch a (20), a switch b (30), a switch c (40), a switch d (50), ..., a switch x (60). The backbone switch 10 is also connected to a data terminal 7 such as a personal computer (PC).

The switch a (20) and switch b (30) are connected to various data terminals 1, 2, 3, 8 and 9. These data terminals can include an IP phone, a PC, a PDA, and so on.

The switch a (20) is also connected to other switches, a switch a'(21) and a switch b'(22), and the switch a'(21) is connected to a switch a"(21a) and a switch b"(21b).

One switch is connected to a number of switches and those switches are connected to other switches, and such a process can be continuously expanded.

When the uplink of the switch a (20) supports a bandwidth of 100M and each of the switch a'(21) and switch b'(22) also has a bandwidth of 100M for their uplinks, a problem can occur when a large quantity of data is transmitted from a PC#5 (4) connected to the switch a"(21a) to a PC#1 (2) connected to the switch a (20).

Since the uplinks of the switch a"(21 a) and switch a'(21) are limited to a bandwidth of 100M, respectively, a severe data congestion phenomenon occurs when a data transmission 18 service is performed between terminals connected to the switch a (20) and switch a'(21) and other terminals connected to the switch a"(21a) or the switch b"(21b).

This problem occurs due to a lack of bandwidth, which has a significant effect on a quality of sound when VoIP service is provided between an IP Phone #1 (1) and an IP Phone #3(5).

The present invention will now be described more fully hereinafter with reference to the accompanying drawings, in which an exemplary embodiment of the present invention is shown. The present invention can, however, be embodied in different forms and should not be construed as being limited to the embodiment set forth herein. Rather, the embodiment is provided so that this disclosure will be thorough and complete, and will fully convey the scope of the present invention to those skilled in the art.

Figure 2:
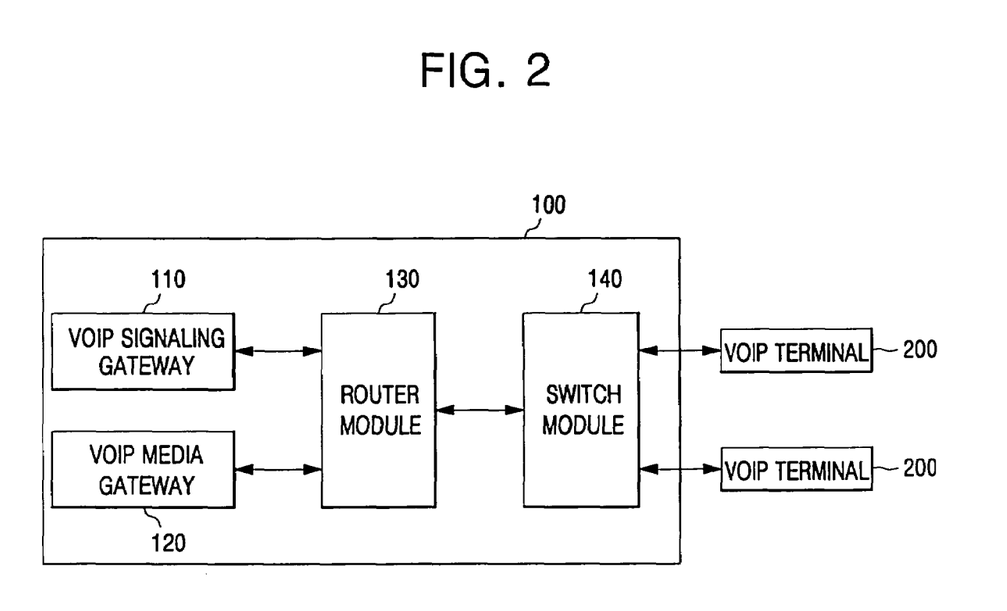
FIG. 2 is a view of a communication system in accordance with an embodiment of the present invention.

FIG. 2 is a view of a configuration of a communication system in accordance with an embodiment of the present invention.

Referring to FIG. 2, the communication system in accordance with an embodiment of the present invention includes a switching system 100 including a VoIP signaling gateway 110, a VoIP media gateway 120, a router module 130 and a switch module 140, and VoIP terminals 200 connected to the switch module 140 of the switching system 100.

The switching system 100 generates a MAC table having MAC addresses of terminals connected to each port of the switch module 140 and performs the port ratio control of the switch module 140 based on the MAC table. By doing so, the switching system 100 previously assigns a bandwidth for processing packets having a specific MAC address among total bandwidths which can be assigned in the switch module 140 to guarantee a necessary port ratio, and designates this specific MAC address as a MAC address of the VoIP terminal.

The port ratio is a ratio of a data transmission bandwidth permitted practically to the maximum data transmission bandwidth, and the port ratio control is suitably establishing the port ratio in a specific situation. For example, when the port ratio is set to 80% in the switch that supports a transmission bandwidth of 100M, although the maximum data transmission bandwidth is 100M, the data transmission bandwidth actually permitted is 80M. So, only the data of 80M or less is permitted to transmit, and the data more than 80M is restricted to transmit.

As such, the switching system 100 assigns a separate bandwidth with respect to the VoIP terminals 200 by managing the MAC address of the VoIP terminals 200 connected to the switch module 140 using the MAC table, so that it is possible to reserve a bandwidth for the VoIP packet even in the switch module 140 included in the layer 2.

For doing that, the switching system 100 has to recognize the VoIP terminals 200.

In the communication system in accordance with an embodiment of the present invention, accordingly, the switching system 100 drives a Dynamic Host Configuration Protocol (DHCP) server module, the VoIP terminal 200 drives a DHCP client module, and the switching system 100 recognizes the VoIP terminal 200 using a host field of DHCP.

The switching system 100 includes a call server function and a data server function which are integrated, wherein the VoIP signaling gateway 110 and the VoIP media gateway 120 perform the call server function, and the router module 130 and the switch module 140 perform the data server function.

The VoIP signaling gateway 110 performs a sound switching function, a signal processing function, and a subscriber terminal management function. Simultaneously, it has information for bandwidths necessary in each voice codec of G.729, G.723, G.726 and G.711.

The VoIP media gateway 120 is a module that provides a function of converting voice into data and transceiving it through a data network, which provides a maximum of 16 channels and a function of voice compression and decompression of G.729, G.723, G.726 and G.711. It simultaneously performs functions of client and server in one board by providing the VoIP function.

The router module 130 is a module used to transmit and receive data to and from an external Internet, which provides ports used to make a connection to internal networks as well as various external interfaces.

The router module 130 integrally manages the VoIP signaling gateway 110, the VoIP media gateway 120 and ID of the VoIP phone 200 by driving the DHCP server module.

The VoIP signaling gateway 110 operates by driving the DHCP client module and is assigned an IP address from the router module 130. The router module 130 recognizes the VoIP signaling gateway using a host ID of DHCP request information and assigns a designated IP address in the DHCP allocation table. The VoIP signaling gateway 110 can also be operated by a fixed IP address that is not a dynamic allocation scheme by the DHCP.

The VoIP media gateway 120 does not assign the IP address manually, but can operate the IP address after dynamically receiving the IP address from the router module 130.

The router module 130 constructs and manages the MAC table including the MAC address information of the terminals connected to each port of the switch module 140 by controlling the switch module 140 and performing a management function for a switch of layer 2.

The router module 130 determines whether a corresponding terminal is the VoIP terminal in order to construct the MAC table, accesses the MAC address of each terminal stored by the switch module 140 from each terminal, and generates the MAC table including the MAC address of the terminal connected to the corresponding port in each port of the switch and a VoIP terminal indication field indicating that the corresponding terminal is a VoIP terminal.

The router module 130 arranges the MAC address of the terminals connected to the corresponding port accessed from each port of the switch module 140 when constructing the MAC table. The router module 130 sets a flag in order to indicate that each terminal connected to the corresponding port is a VoIP terminal when it is true.

The switch module 140 is a switch of the communication layer 2 that performs a function of transmitting data from each terminal 200 connected to each port to another system through the router module 150.

The VoIP terminal 200 is connected to the switch module 140 directly or through a hub. The VoIP terminal 200 has to transmit information indicating that the terminal itself is a VoIP terminal to the switch module 140.

The VoIP terminal 200 has to transmit information indicating that terminal itself is a VoIP terminal 200 to the router module 150 through the switch module 140. When performing the DHCP procedure with the router module 150, the VoIP terminal 200 makes use of an option 13 field for a host name among fields of DHCP messages transmitted to the router module 150 to thereby include identification information of "VoIP-xxx" in the corresponding field.

The identification information of the "VoIP-xxx" set in the corresponding field is information as to the kind of terminals set in a ROM of the terminal when manufacturing the corresponding VoIP terminal. Accordingly, when the corresponding VoIP terminal performs the DHCP procedure after the power is supplied and the loading is performed, it sets the terminal information from the ROM in the option 13 field in which the host name is marked among the fields of the DHCP messages that are used to access the terminal information stored in the ROM and transmit it to the router module 150.

Figure 3:
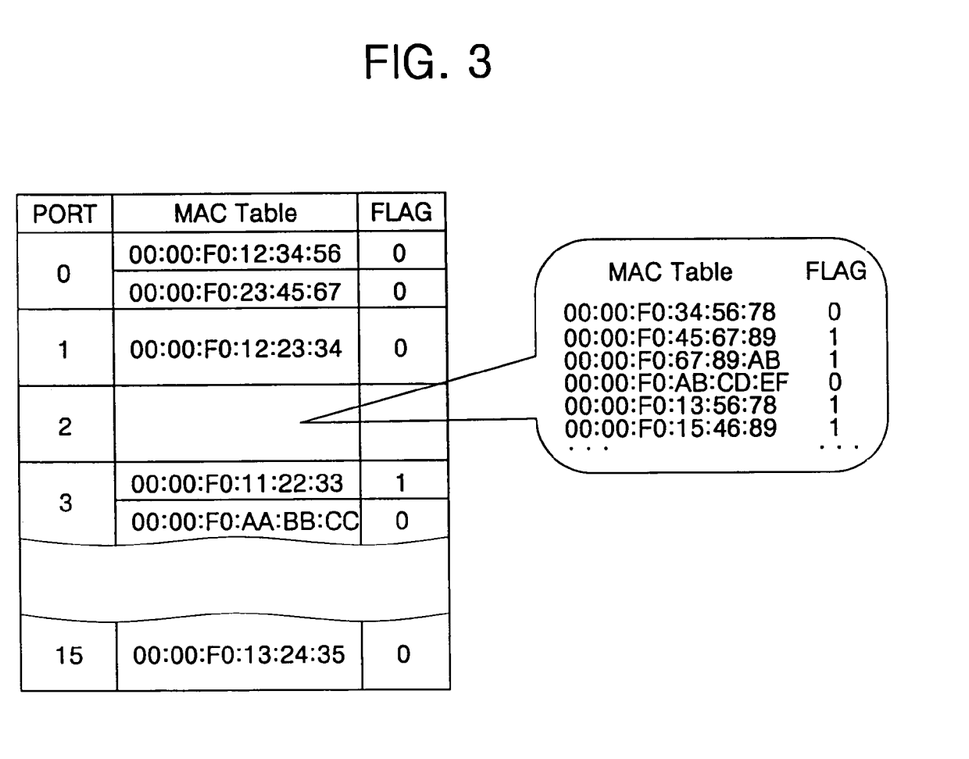
FIG. 3 is a view of an example of a MAC table in accordance with an embodiment of the present invention.

FIG. 3 is a view of an example of a MAC table in accordance with an embodiment of the present invention.

Referring to FIG. 3, MAC addresses of terminals connected to each port from no. 1 to no. 15 are indicated, as are flags indicating whether or not each terminal is a VoIP terminal.

The terminal whose flag is indicated as "1" is the VoIP terminal, and the terminal whose flag is indicated as "0" is not the VoIP terminal but a general data terminal. This information is used in port ratio control utilizing MAC filtering.

Specifically, it can be understood that the port no. 0 is connected to a terminal having a MAC address of 00:00:F0:12:34:56 and a terminal having a MAC address of 00:00:F0:23:45:67. At this time, since flags of the two terminals are indicated as "0", it can be understood that the two terminals are not the VoIP terminals but the general terminals.

Meanwhile, it can be understood that the port no. 3 is connected to a terminal having a MAC address of 00:00:F0:11:22:33 and a terminal having a MAC address of 00:00:F0:11:22:33. At this time, it can be understood that the terminal having the MAC address of 00:00:F0:AA:BB:CC is the VoIP terminal since its flag is indicated as "1". And, it can be understood that the terminal having the MAC address of 00:00:F0:AA:BB:CC is not the VoIP terminal but the general terminal since its flag is indicated as "0".

Figure 4:
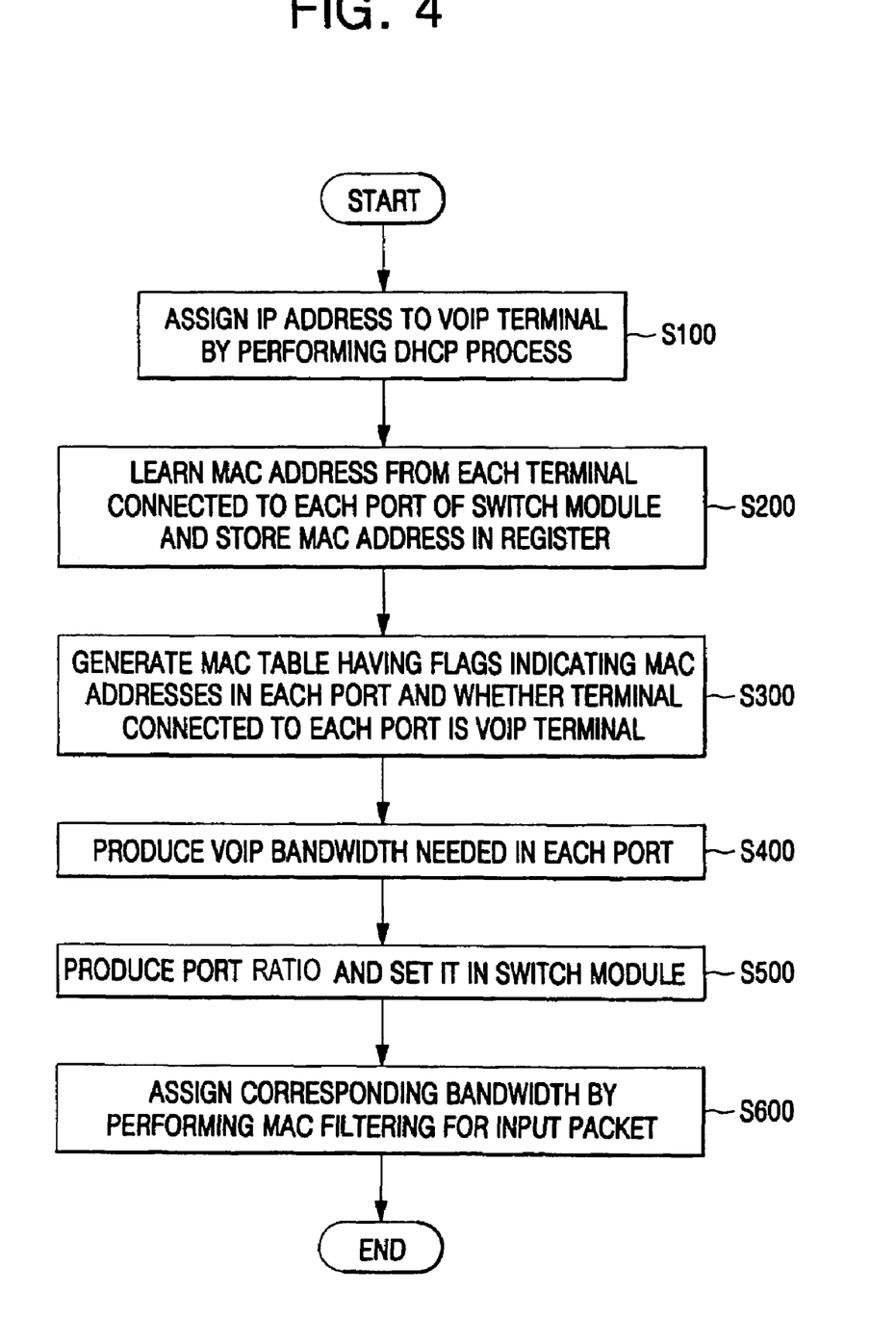
FIG. 4 is a flowchart of assigning a bandwidth to a VoIP packet in a communication system in accordance with an embodiment of the present invention.

FIG. 4 is a flowchart showing an operation to assign a bandwidth to a VoIP packet in a communication system in accordance with an embodiment of the present invention.

Referring to FIG. 4, a DHCP server module is driven in the router module 130, and a DHCP client module is driven in terminals connected to the switch module 140 including the VoIP terminal 200. Accordingly, the router module 130 performs a procedure of assigning an arbitrary IP address among the DHCP allocation IP addresses stored in the module 130 to each terminal connected to the switch (S 100). Such procedure is referred to as a DHCP procedure. The DHCP procedure generally includes a discovery procedure, an offer procedure, a request procedure, and an ack procedure.

Each terminal including the VoIP terminal 200 connected to the switch module 140 does not have the IP address while it is booted as the DHCP client. When it is booted and the network starts, TCP/IP initialization are tried by setting the IP address, first. As a method for doing that, a request to search for the DHCP server is made and a packet is broadcasted. Such procedure is referred to as the discovery procedure.

The router module 130 that has received a discovery message form each terminal connected to the switch module 140 makes a DHCP packet including an available IP address by performing a function of the DHCP server and transmits it using the broadcast to each terminal through the switch. Such procedure is referred to as the offer procedure.

Each terminal receiving the IP address from the router module 130 that performs a function of the DHCP server cannot immediately use the IP address. Each terminal connected to the switch makes a packet including an IP address assigned from the server and an IP of a server that leased the IP address and broadcasts the packet to the network. Such task can be processed since there are several DHCP servers and each server can transmits different IP addresses to the clients. Such procedure is referred to as the "request" procedure to use the assigned IP.

The router module 130 that received the request broadcast of each terminal in which the DHCP client is being driven makes an "acknowledgment" packet including DHCP option values such as an IP lease term, a DNS, a Default Gateway, a WINS, and so on, and finally broadcasts them as the IP sent by the DHCP client is adopted. Such procedure is referred to as the ack procedure.

As such, each terminal connected to the switch module 140 initializes the TCP/IP, and it is possible to perform unicast communication using the IP address from then. Although it may seem to be complicated, the DHCP broadcast occupation ratio in the network is very low. It is important that all of these four procedures are broadcast communications. It is caused by the fact that the VoIP terminal set as the DHCP client does not have the IP address until it obtains the IP address from the DHCP server. Since the VoIP terminal does not have the set IP is address, it is reasonable that it cannot transmit messages to a specific IP of the DHCP server.

Meanwhile, when arbitrary terminals are connected to each port, the switch module 140 learns the MAC addresses of each terminal connected to each port and stores each MAC address in a switch register (S200).

The router module 130 generates a MAC table having MAC addresses corresponding to each port and flags representing information on the VoIP terminals (S300).

Figure 5:
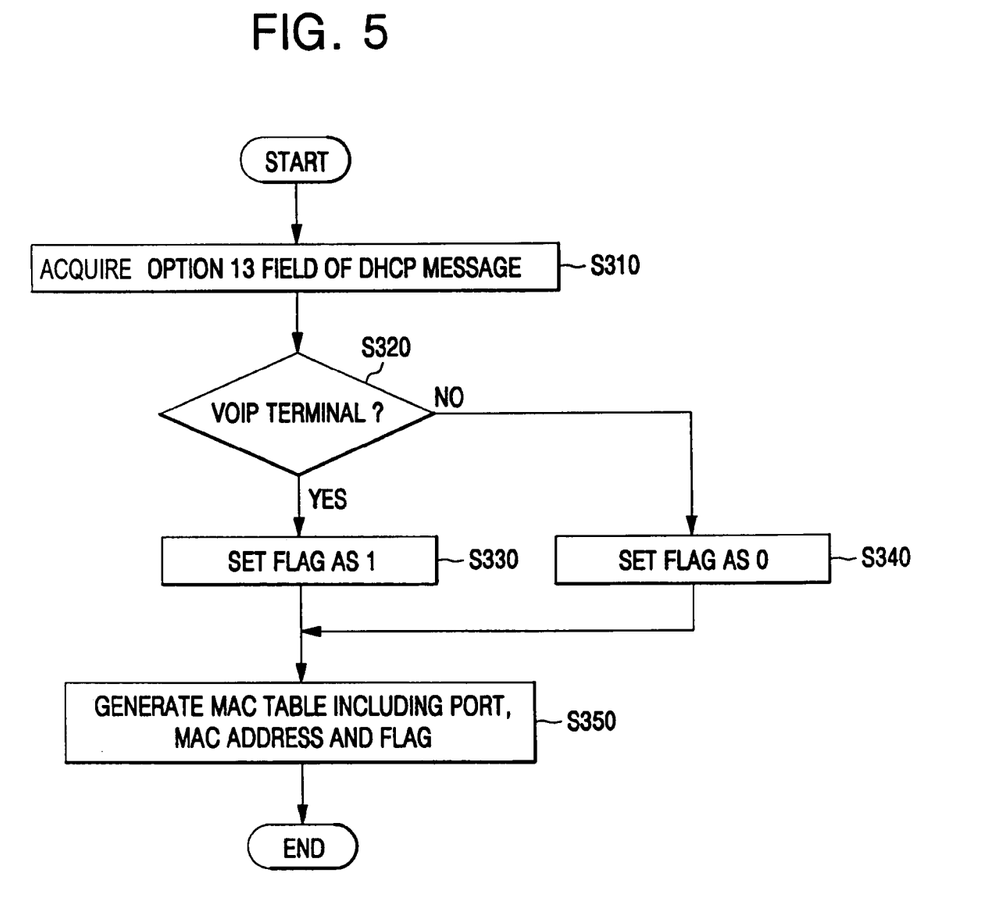
FIG. 5 is a flowchart of generating a MAC table in accordance with an embodiment of the present invention.

On reviewing the procedure to generate the MAC table in detail with reference to FIG. 5, the router module 130 learns a MAC address of the corresponding terminal from the DHCP message transmitted from each terminal that is assigned the IP address from the router module 130, and a value set in the option 13 field used to set a host name in the field of the DHCP message by performing the DHCP procedure in the state that each terminal connected to the switch module 140 is loaded (S310), and determines whether the corresponding terminal is the VoIP terminal (S320).

The router module 130 identifies the MAC addresses of the terminals connected to each port by learning the MAC address stored in the register of the switch module 140. And, the router module 130 sets the flag as "1" when the corresponding terminal is the VoIP terminal according to the result of determining whether each terminal is the VoIP terminal using the DHCP message transmitted from each terminal (S330), and sets the flag as "0" when the corresponding terminal is not the VoIP terminal (S340). And then, the router module 130 generates the MAC table (S350).

Referring to FIG. 4 again, the router module 130 receives codec information stored in the DB of the VoIP signaling gateway 110 and sets a VoIP bandwidth necessary in each port based on the information stored in the MAC table (S400). The codec information to which the router module 130 can refer through the VoIP signaling gateway 110 can include an RTP bandwidth necessary in each VoIP terminal. Table 1 is codec information stored in the DB of the VoIP signaling gateway 110.

After then, the switch module 140 performs the MAC filtering and assigns the 8 bandwidth according to the MAC address of the corresponding packet when arbitrary packet data is input (S600).

Figure 6:
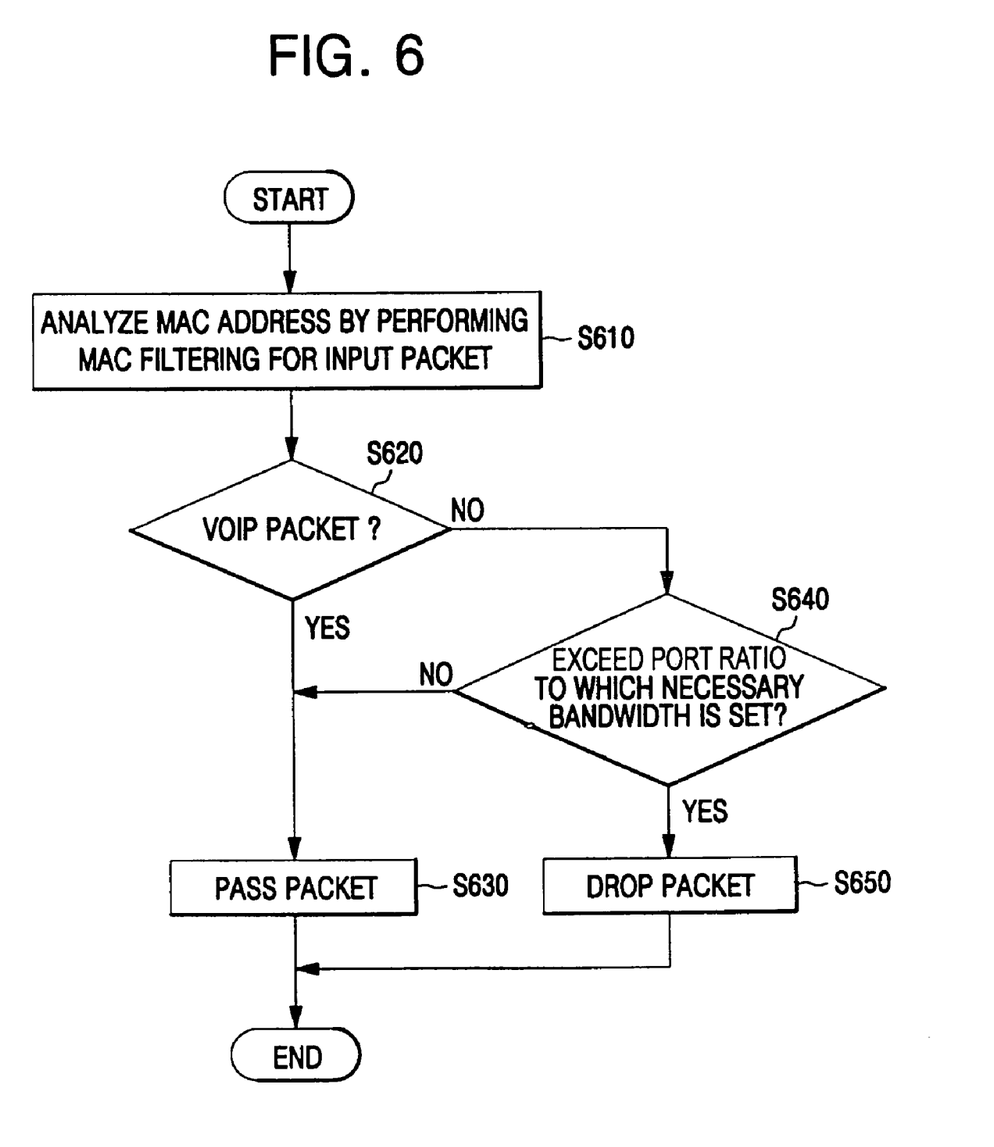
FIG. 6 is a flowchart of bandwidth allocation via MAC filtering in accordance with an embodiment of the present invention.

FIG. 6 is a flowchart of bandwidth allocation through MAC filtering in accordance with an embodiment of the present invention.

Referring to FIG. 6, a corresponding packet is analyzed when an arbitrary packet is input into the switch module 140 (S610), and it is determined whether the corresponding MAC address is an address of the VoIP terminal by detecting an address of a terminal that transmitted the corresponding packet (S620). As a result of the determination, the corresponding MAC address is passed as it is when the MAC address is the MAC address of the VoIP terminal (S630).

Meanwhile, when the MAC address of the terminal that transmitted the corresponding packet is not the MAC address of the VoIP terminal as a result of analyzing the packet input into the switch module 140, it is determined whether a current bandwidth is in the permitted limit of the port ratio set to control the port ratio by applying the port ratio control (S640). And, the packet is passed as it is when the packet is in the

TABLE 1

| | Codec | | | | | | | |
|---|---|---|---|---|---|---|---|---|
| | G.711 | | G.723.1 5.3K | | G.723.1 6.3K | | G.729A | |
| Frame | Silence Enable | Silence Disable | Silence Enable | Silence Disable | Silence Enable | Silence Disable | Silence Enable | Silence Disable |
| 1 | 60.5K | 150.4K | 7.9K | 19.7K | 8.3K | 20.8K | 20.5K | 51.2K |
| 2 | 42.9K | 107.2K | 5.0K | 12.5K | 5.4K | 13.6K | 11.8K | 29.6K |
| 3 | 37.1K | 92.8K | 4.0K | 10.1K | 4.9K | 11.2K | 9.0K | 22.4K |
| 4 | 34.2K | 85.6K | 3.6K | 8.9K | 4.4K | 10.9K | 7.5K | 18.8K |
| 5 | 32.5K | 81.3K | 3.3K | 8.2K | 3.7K | 9.3K | 6.6K | 16.6K |
| 6 | 31.4K | 78.4K | 3.1K | 7.7K | 3.5K | 8.8K | 6.1K | 15.2K |
| 7 | 30.5K | 76.3K | | | | | 5.6K | 14.1K |
| 8 | 30.0K | 74.8K | | | | | 5.4K | 13.4K |
| 9 | 29.4K | 73.6K | | | | | 5.1K | 12.8K |
| 10 | 29.0K | 72.6K | | | | | 4.9K | 12.3K |

Referring to Table 1, when there exist the maximum number of VoIP terminals of 100 in the case of port 2, a bandwidth necessary in the case that the service is provided as the multi-frame 1 in the G.729a silence disable mode is 51.2K*100=5.12M.

When 10 media gateways that can provide 16 channels service are connected in the port 4, a bandwidth of 51.2K*16*10=8.12M is needed. That is, the sum of the bandwidths of each of such ports should be guaranteed in the maximum bandwidth of 100M that is needed in the switch uplink.

That is, since the needed maximum VoIP bandwidth is about 14M, 14% of VoIP bandwidth to the uplink port is excluded and the remaining 86% is used to perform the port ratio control.

The router module 130 sets the port ratio calculated as described above in the switch module 140 (S500).

Accordingly, the switch module 140 leaves 14% of bandwidth among the total bandwidth assigned to each port of the switch module for the VoIP terminal as a separate remainder, and uses only 86% of bandwidth for other terminals that are not the VoIP terminal.

permitted limit, and the packet is not passed and dropped when the current bandwidth is over the permitted limit of the port ratio set already (S650).

As such, by separately assigning the bandwidth to be used by the VoIP terminals and assigning only a limited bandwidth among the entire bandwidth that is assigned to the VoIP terminals to the general terminal that is not the VoIP terminal, the corresponding packet is passed if the arbitrary packet is the VoIP packet even when the general terminal exceeds the set port ratio and then is in the drop state, and guarantees the QoS of the VoIP.

As such, the router module 130 separately assigns as much bandwidth as needed in the VoIP terminal connected to the switch module 140 according to the number of the VoIP terminal connected to the switch module 140 on the basis of the bandwidth suggested in a VoIP codec DB with reference to the VoIP codec DB received from the VoIP signaling gateway 110 in order to set the switch register that supports the port ratio control, and sets the register of the switch module 140 to assign the bandwidth for the general terminal that is not the VoIP terminal in the limit of the bandwidth except the bandwidth assigned for the VoIP terminal from the entire bandwidth.

Meanwhile, when the codec information of the switching system is changed, the VoIP signaling gateway 110 gives information for the DB change to the router module 130 and the router module 130 sets up the environment for the switch module 140. Although the router module 130 can support the dynamic ratio control, since the switch chip has to be re-initialized whenever the switch module 140 is controlled and this can have an effect on the QoS for other links, the router module 140 is constructed to be set statically according to the system DB.

In the above embodiment, in order to reserve and assign the arbitrary bandwidth for the VoIP terminal connected to each port of the switch in the switch, the MAC address of the VoIP terminal connected to each port of the corresponding switch is generated using the MAC table, and the corresponding packet is MAC address filtered in the case of receiving the packet that is transmitted from the arbitrary terminal. When the MAC address of the corresponding packet is a MAC address set to the VoIP terminal in the MAC table, the reserved bandwidth is assigned, and control according to the set port ratio is performed for the other MAC addresses.

By doing so, it is possible to guarantee the QoS for the VoIP terminal that requires a real time data process.

In addition, the present invention is not limited to reserve and assign the bandwidth to the VoIP terminal connected to the switch, and enables specific terminals among each terminal connected to the switch to be selected and terminals having the MAC addresses of the terminals to be assigned a predetermined quantity of bandwidth, in order to guarantee the QoS for the data transmitted from the corresponding terminal with respect to an arbitrary terminal connected to the switch according to the necessity of the system operation even when not the VoIP terminal.

In such case, since the data transmitted from the selected terminals can be transmitted after being assigned the reserved bandwidth to the corresponding terminals in the switch, the set QoS is guaranteed.

According to the present invention, using MAC addresses of communication terminals connected to a switch of communication layer 2, it is possible to guarantee QoS for an arbitrary terminal among the communication terminals connected to the switch according to the necessity of the system operation.

Accordingly, when the communication terminals connected to a switch are processing data different from one another, since a MAC table can assign communication terminals that are needed to preferentially guarantee the QoS, the QoS is preferentially guaranteed prior to the general data packet with respect to the VoIP data requiring real-time data processing.

In the case of communication terminals processing the same kind of data packet, for example, enterprises, even when the QoS should be guaranteed for data received from a communication terminal assigned to an arbitrary department and the data should be preferentially transmitted, it is possible to guarantee the QoS using a bandwidth reservation method with respect to the data received from the communication terminal of the corresponding department when the MAC address of the communication terminal assigned to the corresponding department is registered in the MAC table.

Although an exemplary embodiment of the present invention has been described, it will be understood by those skilled in the art that the present invention is not limited to the described embodiment. Rather, various changes and modifications can be made within the spirit and scope of the present invention, as defined by the following claims.

What is claimed is:

1. A method of guaranteeing Quality Of Service (QoS) using bandwidth reservation in a switch, the method comprising:

establishing a MAC table including MAC addresses of terminals connected to each port of the switch and an identifier indicating whether or not the corresponding terminal is a Voice over Internet Protocol (VoIP) terminal;

calculating a VoIP bandwidth necessary for each port based on information of the MAC table, calculating a ratio of an entire bandwidth to a bandwidth equal to the entire bandwidth minus the VoIP bandwidth, and setting the ratio as a port ratio of the switch;

determining whether or not a corresponding packet is a VoIP packet by filtering the MAC address of the corresponding packet upon an arbitrary packet being input into the switch; and passing the corresponding packet upon a determination that the corresponding packet is a VoIP packet, and passing the corresponding packet only when the bandwidth of the corresponding packet is within a permissible limit of the set port ratio by performing port ratio control upon a determination that the corresponding packet is not a VoIP packet.

2. The method according to claim 1, wherein establishing the MAC table comprises:

acquiring and storing the MAC addresses of terminals connected to each port of the switch;

receiving arbitrary information from each terminal and determining whether or not the corresponding terminal is a VoIP terminal; and accessing the MAC addresses stored in the switch and acquiring the MAC address of the terminal connected to the corresponding port in each port of the switch, and generating the MAC table by setting a flag indicating that an arbitrary terminal corresponding to the acquired MAC address is a VoIP terminal according to the result of the determination.

3. The method according to claim 2, wherein determining whether or not the corresponding terminal is a VoIP terminal comprises recognizing the corresponding terminal as a VoIP terminal upon identification information indicating that the corresponding terminal is a VoIP terminal set in a Dynamic Host Configuration Protocol (DHCP) message used to perform a DHCP process assigning an IP address to the VoIP terminal.

4. The method according to claim 3, wherein the DHCP message comprises identification information set in an option 13 indicating a host, the identification information indicating that the corresponding terminal is a VoIP terminal.

5. The method according to claim 1, wherein setting the port ratio of the switch comprises:

acquiring bandwidth information required for each terminal set as a VoIP terminal in the MAC table;

counting the number of terminals set as VoIP terminals in the MAC table for each kind of terminal;

calculating a bandwidth required for an entire VoIP terminal by calculating the bandwidth for each terminal and the number of corresponding terminals; and calculating a ratio of an entire bandwidth supportable in the switch to a bandwidth equal to the entire bandwidth minus the entire VoIP bandwidth and setting the ratio as a port ratio.

6. The method according to claim 5, wherein the bandwidth required for the corresponding VoIP terminal is acquired from a database storing at least one piece of bandwidth information for each codec.

7. A communication system comprising:
a switching system adapted to establish a MAC table including MAC addresses of terminals connected to each port of a switch and an identifier indicating whether or not a corresponding terminal is a VoIP terminal, and adapted to process the corresponding packet by assigning a bandwidth reserved in the switch upon the corresponding packet being determined to be a VoIP packet on the basis of the MAC table by filtering an originating MAC address of the corresponding packet upon an arbitrary packet being input; and
at least one VoIP terminal, the at least one VoIP terminal being assigned an IP address from the switching system by being connected to the switch of the switching system, and being guaranteed a Quality of Service (QoS) set using the bandwidth reserved in the switch of the switching system via the MAC address of the VoIP terminal registered in the MAC table of the switching system.

8. The system according to claim 7, wherein the switching system comprises:
a VoIP signaling gateway adapted to manage switching and processing of a voice signal, a subscriber terminal, and bandwidth information needed for each voice codec;
a VoIP media gateway adapted to convert a voice into data using a voice compression and decompression function and to transceive the data via a data network;
a switch module adapted to pass an arbitrary packet upon the packet being determined to be a VoIP packet by performing MAC filtering upon the arbitrary packet being input, and adapted to pass or block the packet depending on an already set port ratio upon the packet being a packet other than a VoIP packet; and
a router module adapted to establish a MAC table including MAC address information of the terminals connected to each port of the switch module and identification information indicating that an arbitrary terminal is a VoIP terminal, and adapted to calculate a bandwidth required in the VoIP terminal connected to the switch module, and adapted to set a port ratio of the switch in the switch module according to a ratio of an available entire bandwidth to a bandwidth equal to the entire bandwidth minus the VoIP bandwidth.

9. The system according to claim 8, wherein the router module is adapted to arrange the MAC addresses of the terminals connected to the corresponding port acquired from each port of the switch module upon establishing the MAC table, and to set a flag to indicate that each terminal connected to the corresponding port is a VoIP terminal upon each terminal connected to the corresponding port being determined to be a VoIP terminal.

10. The system according to claim 8, wherein the router module is adapted to assign and manage an IP address for each terminal connected to the switch module by driving a Dynamic Host Configuration Protocol (DHCP) server module.

11. The system according to claim 8, wherein the router module is adapted to recognize the corresponding terminal as a VoIP terminal upon identification information indicating that the corresponding terminal is a VoIP terminal being set in a DHCP message used to perform a DHCP process assigning an IP address to the VoIP terminal.

12. The system according to claim 11, wherein the DHCP message comprises information set in an option 13 indicating a host, the identification information indicating that the corresponding terminal is a VoIP terminal.

13. The system according to claim 7, wherein the VoIP terminal is assigned an IP address from the switching system by driving a DHCP client module.

14. A method of guaranteeing a Quality of Service (QoS) using bandwidth reservation in a switch, the method comprising:
establishing a MAC table including MAC addresses of terminals connected to each port of the switch and an identifier indicating whether or not a corresponding terminal is a specific terminal;
calculating a reservation bandwidth necessary in each port based on information of the MAC table, calculating a ratio of an entire bandwidth to a bandwidth equal to the entire bandwidth minus the reservation bandwidth, and setting the ratio as a port ratio of the switch;
determining whether or not the corresponding packet is a packet of the specific terminal by filtering a MAC address of the corresponding packet upon an arbitrary packet being inputted to the switch; and
passing the corresponding packet upon a determination that the corresponding packet is the packet of the specific terminal, and passing the corresponding packet only when a bandwidth of the corresponding packet is within a permissible limit of the set port ratio by performing port ratio control upon a determination that the corresponding packet is not the packet of the specific terminal.

15. A communication system comprising:
a switching system adapted to establish a MAC table including MAC addresses of terminals connected to each port of a switch and an identifier indicating whether or not the corresponding terminal is a specific terminal, and adapted to process a corresponding packet when an arbitrary packet is inputted by assigning the bandwidth reserved in the switch when the corresponding packet is determined to be a packet of the specific terminal on the basis of the MAC table by filtering an originating MAC address of the corresponding packet; and
at least one communication terminal adapted to being assigned an IP address from the switching system by being connected to the switch of the switching system, and adapted to being guaranteed QoS using a bandwidth reserved in the switch of the switching system via the MAC address of the VoIP terminal registered in the MAC table of the switching system.

* * * * *

UNITED STATES PATENT AND TRADEMARK OFFICE
CERTIFICATE OF CORRECTION

| | | |
|---|---|---|
| PATENT NO. | : 7,653,047 B2 | Page 1 of 1 |
| APPLICATION NO. | : 11/028860 | |
| DATED | : January 26, 2010 | |
| INVENTOR(S) | : Dae-Hyun Lee | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1423 days.

Signed and Sealed this

Twenty-eighth Day of December, 2010

David J. Kappos
*Director of the United States Patent and Trademark Office*